(12) United States Patent
Miyamoto (10) Patent No.: US 12,515,512 B2
(45) Date of Patent: Jan. 6, 2026

(54) ELECTRIFIED VEHICLE

(71) Applicant: TOYOTA JIDOSHA KABUSHIKI KAISHA, Toyota (JP)

(72) Inventor: Yuuki Miyamoto, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 205 days.

(21) Appl. No.: 18/425,016

(22) Filed: Jan. 29, 2024

(65) Prior Publication Data

US 2024/0336128 A1    Oct. 10, 2024

(30) Foreign Application Priority Data

Apr. 5, 2023    (JP) ................................. 2023-061734

(51) Int. Cl.
| | |
|---|---|
| *B60K 6/40* | (2007.10) |
| *B60K 1/04* | (2019.01) |
| *B60L 53/20* | (2019.01) |
| *B60W 20/00* | (2016.01) |
| *F01N 3/20* | (2006.01) |
| *B60L 1/02* | (2006.01) |

(52) U.S. Cl.
CPC .................. *B60K 6/40* (2013.01); *B60K 1/04* (2013.01); *B60L 53/20* (2019.02); *B60W 20/00* (2013.01); *F01N 3/2013* (2013.01); *B60K 2001/0405* (2013.01); *B60L 1/02* (2013.01); *B60Y 2200/92* (2013.01)

(58) Field of Classification Search
None
See application file for complete search history.

(56) References Cited

FOREIGN PATENT DOCUMENTS

| JP | 2013-115889 A | 6/2013 | |
|---|---|---|---|
| JP | 2023-161866 A | 11/2023 | |
| WO | WO-2017017762 A1 * | 2/2017 | .............. B60L 50/72 |
| WO | WO-2020129257 A1 * | 6/2020 | .............. B60L 58/27 |

* cited by examiner

*Primary Examiner* — Peter D Nolan
*Assistant Examiner* — Michael F Whalen
(74) *Attorney, Agent, or Firm* — SoraIP, Inc.

(57) ABSTRACT

In electrified vehicle, a charger is disposed above the machine-electric integrated unit, and an input/output port for electric power is provided on the power source chamber side of a battery disposed on the power source chamber side vertically downward with respect to the driver's seat. Further, the power control device is provided with a branching portion that branches an electric path from the battery, in which the power control device side of the first electric wiring connecting the input-output port and the power control device and the power control device side of the second electric wiring connecting the power control device and the charger are connected to each other.

5 Claims, 6 Drawing Sheets

FIG. 6 COMPARATIVE EXAMPLE

ELECTRIFIED VEHICLE

CROSS-REFERENCE TO RELATED APPLICATION

This application claims priority to Japanese Patent Application No. 2023-061734 filed on Apr. 5, 2023, incorporated herein by reference in its entirety.

BACKGROUND

1. Technical Field

The present disclosure relates to an electrified vehicle on which an electric motor and a charger are mounted.

2. Description of Related Art

An electrified vehicle including an electric motor functioning as a power source, a power transmission device that transmits power from the electric motor to a drive wheel, a battery for driving, a charger that charges the battery by electric power supplied from an external power source, and a power control device that controls electric power transmitted and received between the battery and the electric motor is well known. For example, a plug-in hybrid battery electric vehicle described in Japanese Unexamined Patent Application Publication No. 2013-115889 (JP 2013-115889 A) applies to the above electrified vehicle. JP 2013-115889 A discloses a vehicle including an electric motor and a power control device disposed on a vehicle front side, a battery disposed in a vehicle center, and a charger disposed on a vehicle rear side.

SUMMARY

In order to shorten the path length of an electric wire connecting the power control device and the battery, it is conceivable to dispose the battery disposed in the vehicle center so as to be close to the power control device disposed on the vehicle front side, and to provide an input-output port for electric power of the battery on the vehicle front side. In this case, since the charger disposed on the vehicle rear side needs to be connected to the input-output port for the electric power of the battery, an issue arises in which the path length of the electric wire used in the electrified vehicle becomes long.

The present disclosure has been made in view of the above circumstances, and an object thereof is to provide an electrified vehicle capable of shortening the path length of the electric wire.

An electrified vehicle according to an aspect of the present disclosure includes:
  an electric motor functioning as a power source;
  a power transmission device for transmitting power from the electric motor to a drive wheel;
  a battery for driving;
  a charger for charging the battery by electric power supplied from an external power source; and
  a power control device for controlling electric power transmitted and received between the battery and the electric motor, in which:
  a drive device including the electric motor and the power transmission device, and the power control device are housed, as an electromechanical integrated unit, in the same case, and are disposed in a power source chamber that is adjacent to a driver's seat chamber in which a driver's seat is disposed;
  the charger is disposed above the electromechanical integrated unit in a vertical direction in a state in which the charger is mounted on the electrified vehicle;
  the battery is disposed on the power source chamber side below the driver's seat chamber in the vertical direction, and is provided with an input-output port for electric power on the power source chamber side; and
  the electrified vehicle further includes
  a first electric wire connecting the input-output port of the battery and the power control device,
  a second electric wire connecting the power control device and the charger, and
  a branching portion that is provided in the power control device and branches an electric path from the battery, the electric path being a path to which each of the power control device side of the first electric wire and the power control device side of the second electric wire is connected.

According to the above aspect, the charger is disposed above the electromechanical integrated unit including the drive device and the power control device, and the battery disposed on the power source chamber side below the driver's seat chamber in the vertical direction is provided the input-output port for the electric power on the power source chamber side. In addition, the power control device is provided with the branching portion that branches the electric path from the battery, the electric path being a path to which each of the power control device side of the first electric wire connecting the input-output port of the battery and the power control device and the power control device side of the second electric wire connecting the power control device and the charger is connected. As a result, the path length of the electric wire connecting the charger and the battery can be shortened as compared with the case where the charger is disposed in a space on an opposite side of the driver's seat chamber from the power source chamber. In addition, the first electric wire is utilized for the connection between the charger and the battery, so that only the path length of the second electric wire is substantially required. Therefore, it is possible to shorten the path length of the electric wire in the electrified vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a diagram for explaining an example of an electrical configuration related to electric motor control, charge control, and the like;

DETAILED DESCRIPTION OF EMBODIMENTS

Hereinafter, examples of the present disclosure will be described in detail with reference to the drawings.

Figure 1:
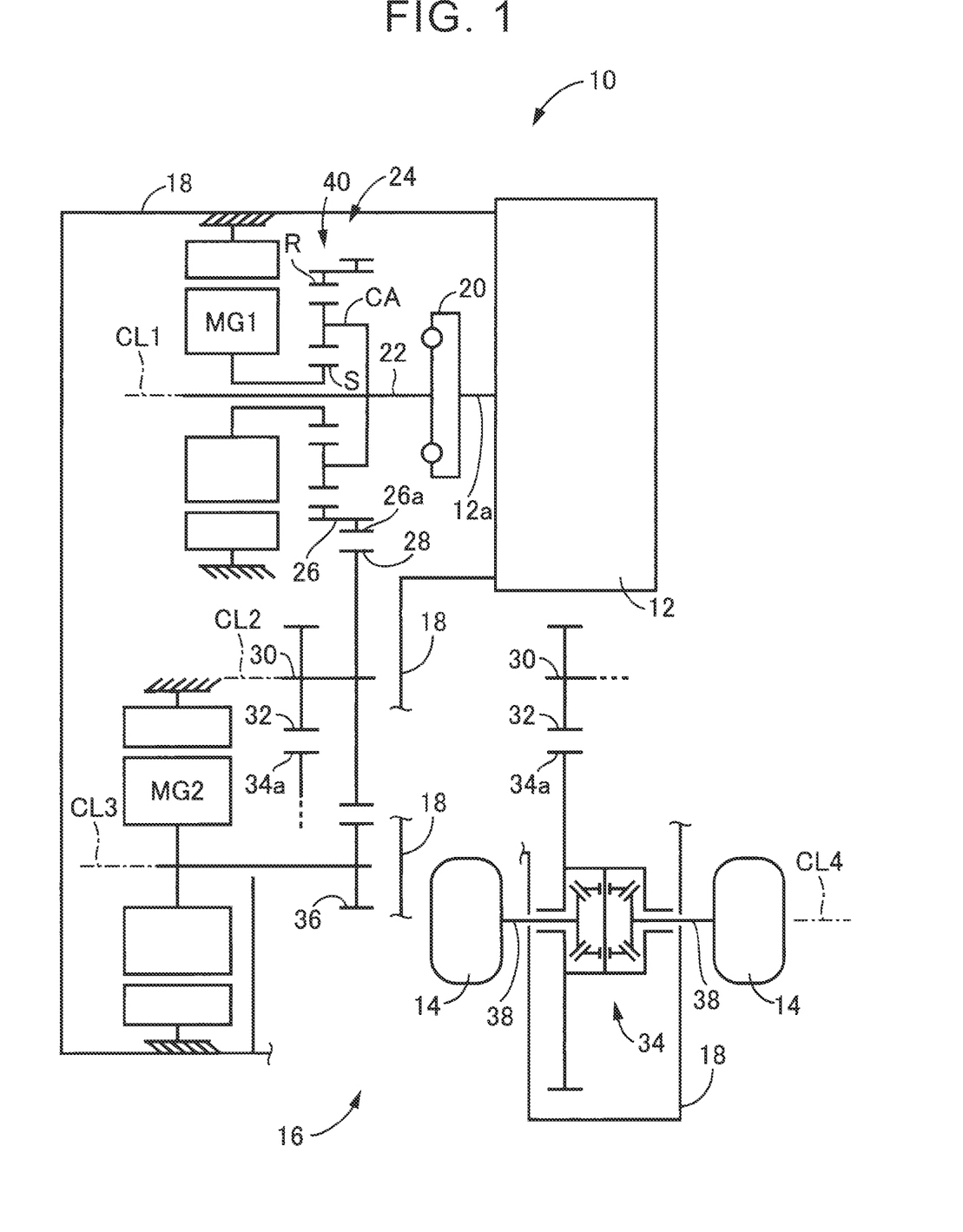
FIG. 1 is a diagram illustrating an exemplary schematic configuration of an electrified vehicle to which the present disclosure is applied.

FIG. 1 is a diagram illustrating an exemplary schematic configuration of an electrified vehicle 10 to which the present disclosure is applied. In FIG. 1, electrified vehicle 10 is a hybrid electric vehicle including an engine 12 functioning as a power source and a second electric motor MG2 serving as an electric motor functioning as a power source. Electrified vehicle 10 also includes drive wheels 14, a power transmission device 16, and a first electric motor MG1.

The engine 12 is a known internal combustion engine. The drive wheels 14 are left and right wheels with respect to the forward and backward directions of electrified vehicle 10. The power transmission device 16 is provided in a power transmission path between the engine 12 and the drive wheels 14 and in a power transmission path between the second electric motor MG2 and the drive wheels 14.

Each of the first electric motor MG1 and the second electric motor MG2 is a known rotary electric machine having a function as an engine for generating mechanical power from electric power and a function as a generator for generating electric power from mechanical power, and is a so-called motor generator. The first electric motor MG1 and the second electric motor MG2 are provided in a non-rotatable case 18 which is a non-rotatable member attached to the vehicle body.

The power transmission device 16 includes, in the case 18, a damper 20, an input shaft 22, a transmission unit 24, a composite gear 26, a driven gear 28, a driven shaft 30, a final gear 32, a differential gear 34, a reduction gear 36, and the like. The input shaft 22 functions as an input rotating member of the transmission unit 24 and is connected to the crankshaft 12a of the engine 12 via a damper 20 or the like. The transmission unit 24 is connected to the input shaft 22. The composite gear 26 is a rotating body on the output side of the transmission unit 24. In the composite gear 26, a drive gear 26a is formed on a part of the outer peripheral surface. The drive gear 26a is an output-rotating member of the transmission unit 24. The driven gear 28 meshes with the drive gear 26a. The driven shaft 30 fixes the driven gear 28 and the final gear 32 so as not to be relatively rotatable. The final gear 32 is smaller in diameter than the driven gear 28 and meshes with the differential gear 34a of the differential gear 34. The reduction gear 36 is smaller in diameter than the driven gear 28 and meshes with the driven gear 28. A rotor shaft of the second electric motor MG2 is connected to the reduction gear 36, and the second electric motor MG2 is connected so as to be able to transmit power. The power transmission device 16 includes a pair of drive shafts 38 and the like connected to the differential gear 34.

The power transmission device 16 configured as described above is preferably used in vehicles of a front engine/front drive (FF) type or a rear engine/rear drive (RR) type. The power transmission device 16 transmits the power output from the engine 12 to the driven gear 28 via the transmission unit 24. Further, the power transmission device 16 transmits the power outputted from the second electric motor MG2 to the driven gear 28 via the reduction gear 36. The power transmission device 16 transmits the power transmitted to the driven gear 28 to the drive wheels 14 through the driven shaft 30, the final gear 32, the differential gear 34, the drive shaft 38, and the like in order.

The transmission unit 24 includes a first electric motor MG1 and a differential mechanism 40. The differential mechanism 40 is a known single pinion type planetary gear set including a sun gear S, a carrier CA, and a ring gear R. The sun gear S is connected to the rotor shaft of the first electric motor MG1, and the first electric motor MG1 is connected so as to be able to transmit power. The carrier CA is connected to the input shaft 22, and the engine 12 is connected via the input shaft 22 or the like so as to be capable of transmitting power. The ring gear R is formed on a part of the inner circumferential surface of the composite gear 26 and is integrally connected to the drive gear 26a.

The differential mechanism 40 functions as a differential mechanism that generates a differential operation in which the engine 12 is connected to be capable of transmitting power. The first electric motor MG1 is a differential electric motor that is connected to the differential mechanism 40 so as to be capable of transmitting power. The differential mechanism 40 is a power split mechanism that mechanically divides the power of the engine 12 inputted to the carrier CA into a first electric motor MG1 and a drive gear 26a. The transmission unit 24 is a known electric transmission mechanism in which the differential state of the differential mechanism 40 is controlled by controlling the operating state of the first electric motor MG1.

The power transmission device 16 has a first axis CL1, a second axis CL2, a third axis CL3, and a fourth axis CL4. These four axes CL1, CL2, CL3, CL4 are parallel to each other. The first axis CL1 is an axis center of the rotor shaft of the input shaft 22 or the first electric motor MG1. That is, the first axis CL1 is the rotational axis of the first electric motor MG1. The transmission unit 24 and the first electric motor MG1 are disposed around the first axis CL1. The second axis CL2 is an axis center of the driven shaft 30. The driven gear 28 and the final gear 32 are disposed around the second axis CL2. That is, the second axis CL2 is the rotational axis of the driven gear 28, the driven shaft 30, and the final gear 32. The third axis CL3 is the axis of the rotor shaft of the second electric motor MG2. That is, the third axis CL3 is the rotational axis of the second electric motor MG2. The second electric motor MG2 and the reduction gear 36 are disposed around the third axis CL3. The fourth axis CLA is an axis of the drive shaft 38 and an axis of the differential gear 34. That is, the fourth axis CL4 is the rotational axis of the differential gear 34. The differential gear 34 is disposed around the fourth axia CL4.

Figure 2:
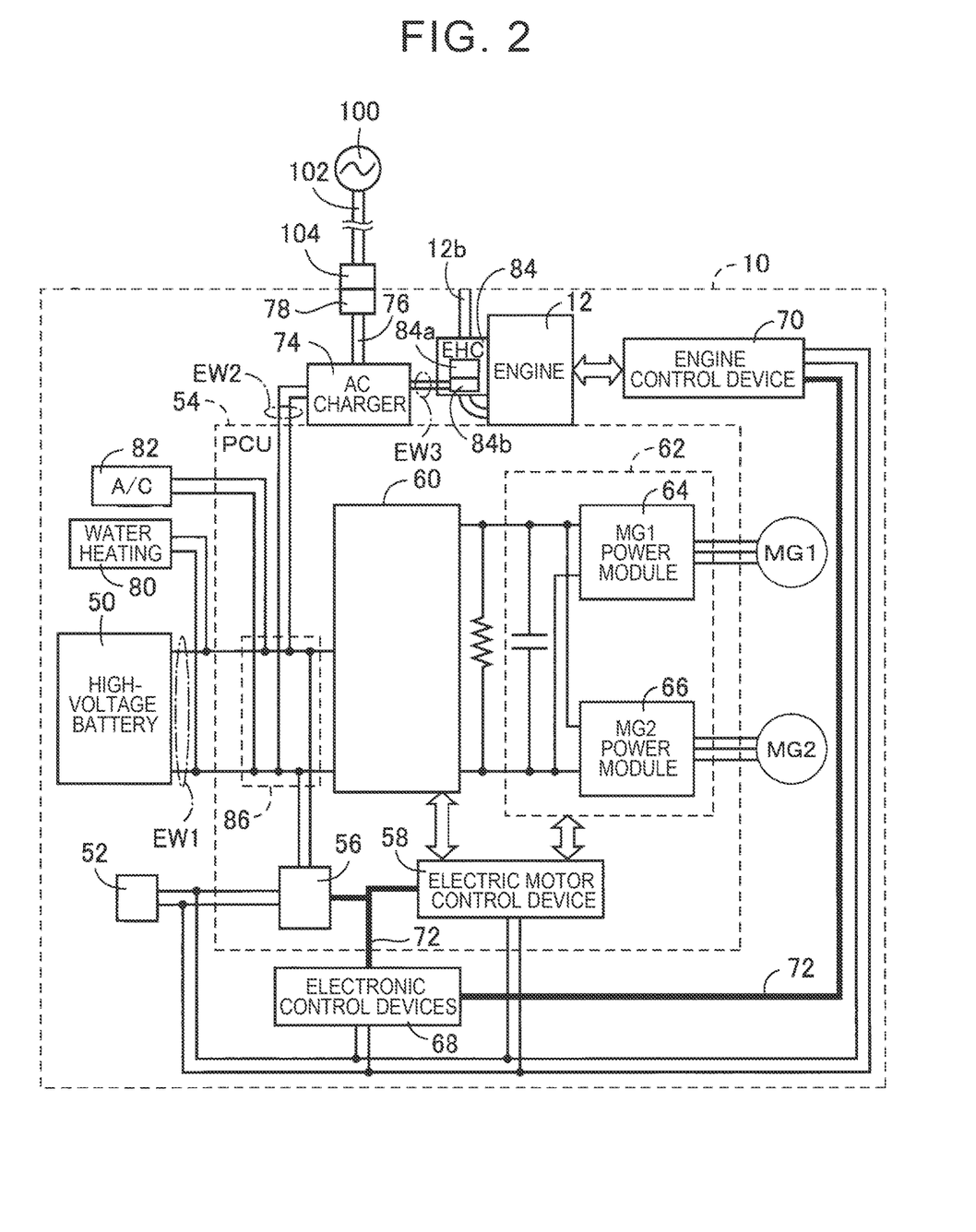

FIG. 2 is a diagram illustrating an example of an electrical configuration related to electric motor control, charge control, and the like. In FIG. 2, electrified vehicle 10 further includes a high-voltage battery 50, an auxiliary battery 52, a power control unit 54 (see "PCU" in the drawing), and the like.

The high-voltage battery 50 is a chargeable/dischargeable DC power source, and is a secondary battery such as a nickel-hydrogen secondary battery or a lithium-ion battery. The high voltage battery 50 is connected to the power control unit 54. The stored electric power is supplied from the high-voltage battery 50 to, for example, the second electric motor MG2 via the power control unit 54. The high-voltage battery 50 is supplied with electric power by the power generation control of the first electric motor MG1 and electric power by the regenerative control of the second electric motor MG2 via the power control unit 54. The high-voltage battery 50 is a battery for driving.

The power control unit 54 includes a DCDC converter 56, an electric motor control device 58, a step-up converter 60, an inverter 62, and the like. The power control unit 54 is a power control device that controls electric power exchanged between the high-voltage battery 50 and the first electric motor MG1 and the second electric motor MG2.

DCDC converters 56 are connected to the high voltage battery 50. DCDC converter 56 functions as a charging device that reduces the voltage of the high-voltage battery 50 to a voltage equivalent to that of the auxiliary battery 52 and charges the auxiliary battery 52. The electric power stepped down by DCDC converters 56 is supplied to the vehicle accessories, the electric motor control device 58, the electronic control device 68, the engine control device 70, and the like (not shown). The vehicle accessory is an auxiliary device such as a lamp or audio provided in an electrified vehicle 10. The electronic control device 68 and the engine control device 70 are each a control unit separate from the power control unit 54, in particular the electric motor control device 58. The auxiliary battery 52 is a low-voltage battery that supplies electric power for operating the auxiliary equipment, the electronic control device 68, and the like. As described above, DCDC converter 56 is a voltage converter that steps down the DC power from the high-voltage battery 50 and supplies it to the auxiliary battery 52, the electronic control device 68, and the like.

The step-up converter 60 includes a reactor, a switching element, and the like (not shown). The step-up/step-down converter 60 is a step-up/step-down circuit having a function of boosting the voltage of the high-voltage battery 50 and supplying the voltage to the inverter 62, and a function of stepping down the voltage converted into a direct current by the inverter 62 and supplying the stepped-down voltage to the high-voltage battery 50.

The inverter 62 includes a MG1 power module 64, a MG2 power module 66, and the like. MG1 power module 64 and MG2 power module 66 each include a switching device (not shown) and the like. Inverter 62 converts the direct current from boost converter 60 into an alternating current for driving first electric motor MG1 and second electric motor MG2. The inverter 62 converts an alternating current generated by the first electric motor MG1 by the power of the engine 12 and an alternating current generated by the second electric motor MG2 by the regenerative braking into a direct current. The inverter 62 supplies the alternating current generated by the first electric motor MG1 as the driving power of the second electric motor MG2 in accordance with the running condition.

Electrified vehicle 10 further includes an electronic control device 68, an engine-control device 70, a communication line 72, and the like.

The electronic control device 68 transmits and receives signals to and from DCDC converters 56, the electric motor control device 58, the engine control device 70, and the like via the communication lines 72. The electronic control device 68 performs various types of control of electrified vehicle 10 based on, for example, a signal from a sensor (not shown) or the like. The communication line 72 is, for example, a known Controller Area Network (CAN) communication line.

The electric motor control device 58 controls the step-up converters 60 and the inverters 62 based on commands from the electronic control device 68, and controls the first electric motor MG1 and the second electric motor MG2. For example, the electric motor control device 58 converts a direct current from the high-voltage battery 50 into an alternating current used for the first electric motor MG1 and the second electric motor MG2. The electric motor control device 58 drives the first electric motor MG1 in order to secure a power generation required to supply electric power to the second electric motor MG2 and to charge the high-voltage battery 50. The electric motor control device 58 drives the second electric motor MG2 on the basis of a required value corresponding to a required torque of the driver. The electric motor control device 58 causes the second electric motor MG2 to function as a generator in accordance with the required quantity of the regenerative braking.

The engine control device 70 controls the engine 12 based on a command from the electronic control device 68. For example, the engine control device 70 drives an electronic throttle valve, an ignition device, a fuel injection device, or the like to control the output of the engine 12.

Electrified vehicle 10 further includes an AC charger 74, an in-vehicle charging cable 76, an AC inlet 78, and the like.

AC charger 74 is connected to the high-voltage battery 50. AC charger 74 is connected to AC inlet 78 via an in-vehicle charging cable 76. AC inlet 78 is provided in the vehicle body so as to be connectable to a charge connector 104 of an external charging cable 102 connected to an external power source 100 which is an external power source of electrified vehicle 10. AC inlet 78 is connected to the charge connector 104 and is a terminal for inputting electric power supplied from the external power source 100. AC inlet 78 is a charging port connected to the external power source 100.

AC charger 74 converts a current between an alternating current and a direct current. AC charger 74 is a charger that charges the high-voltage battery 50 with electric power supplied from the external power source 100. AC charger 74 converts an alternating current supplied from the external power source 100 into a direct current, and boosts the voltage of the external power source 100 to a voltage equivalent to that of the high-voltage battery 50 to charge the high-voltage battery 50. When the charge connector 104 is connected to AC inlet 78, electric power from the external power source 100 is supplied to the high-voltage battery 50 via AC charger 74 or the like. Electrified vehicle 10 is a so-called plug-in hybrid electric vehicle in which the high-voltage battery 50 can be charged by electric power from the external power source 100.

Electrified vehicle 10 further includes a water heater 80 (see "Water Heating" in the figure), an electric compressor 82 (see "A/C" in the figure), an electrically heated catalyst 84 (see "EHC" in the figure), and the like.

The water heater 80 is connected to the high-voltage battery 50. The water heater 80 is a heater that heats a fluid as a heat source for heating in the driver's seat chamber 98, which will be described later. The electric compressor 82 is connected to the high-voltage battery 50. The electric compressor 82 is a compressor used in an air conditioner system provided in an electrified vehicle 10. The electrically heated catalyst 84 is provided in the exhaust passage 12b of the engine 12. The electrically heated catalyst 84 includes a catalyst 84a and an electric heater 84b. The catalyst 84a is a known three-way catalyst for purifying, for example, hydrocarbons (HC), carbon monoxide (CO), nitrogen oxides (NOx), and the like in the exhaust gas. The electric heater 84b is connected to AC charger 74. The electric heater 84b is a heater that warms up the catalyst 84a and activates the catalyst 84a.

Figure 3:
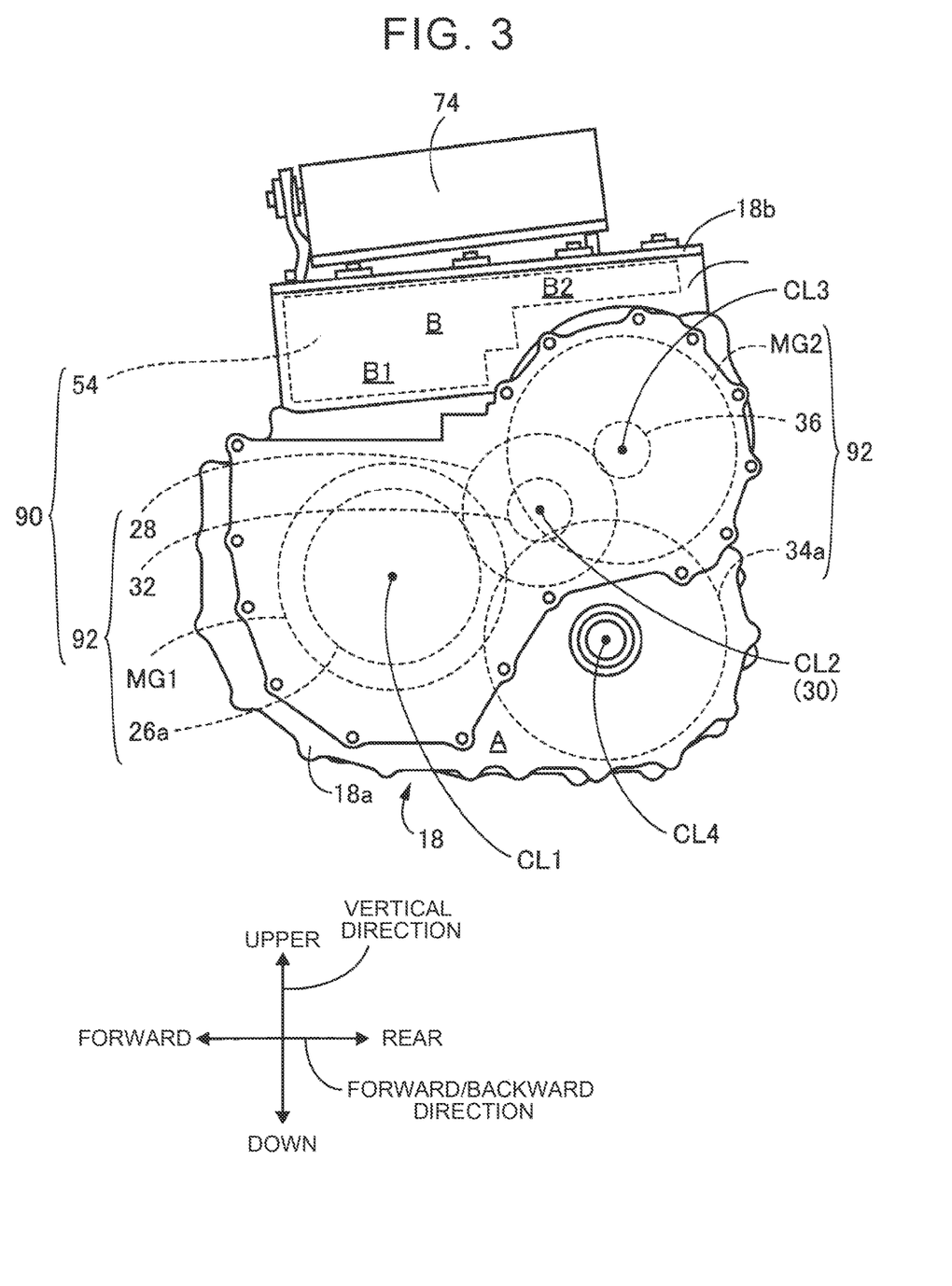
FIG. 3 is a diagram illustrating an example of a schematic configuration of an electromechanical integrated unit.

FIG. 3 is a diagram illustrating an example of a schematic configuration of the hybrid drive unit 90. FIG. 3 is a side view from the left side of electrified vehicle 10. In FIG. 3, the transaxle 92 and the power control unit 54 are housed in the same case 18 as the hybrid drive unit 90. The hybrid drive unit 90 is a unit in which the transaxle 92 and the power control unit 54 are integrated, that is, an electromechanical integrated unit. Transaxle 92 is a drive device including a power transmission device 16 (26a, 28, 32, 34a, 36, etc.), a first electric motor MG1, and a second electric motor MG2. The engine 12 is disposed at a position adjacent to the hybrid drive unit 90 (see FIG. 4). Note that the vertical direction, the forward-backward direction, and the vehicle-width direction (see FIG. 4) indicate the direction in electrified vehicle 10 in the mounted condition. The vehicle width direction is an axial direction of each of the first axis CL1, the second axis CL2, the third axis CL3, and the fourth axis CL4

The case 18 includes, for example, a main body 18a and a cover-plate 18b. The main body 18a has a bottom wall and a side wall extending vertically upward from an outer peripheral edge of the bottom wall, and an upper portion in the vertical direction is opened. The cover plate 18b is a plate-shaped member that closes the opening of the main body 18a. The main body 18a has a partition wall (not shown) inside, and the inside is partitioned by the partition wall into two spaces: a space A in a vertical lower portion and a space B in a vertical upper portion.

The transaxle 92 is accommodated in the space A in the vertical lower portion of the main body 18a in the mounted condition in electrified vehicle 10. The power control unit 54 is accommodated in the space B in the vertical upper portion of the main body 18a in the mounted condition in electrified vehicle 10. The vertical upper space B includes a vertical upper space B2 of the second electric motor MG2 and an excess space B1 generated by the arrangement of the first electric motor MG1 and the second electric motor MG2. The excess space B1 is shorter in length in the forward/backward direction than in the space B2.

Referring to FIG. 3, the transaxle 92 is disposed in electrified vehicle 10 so that the first axis CL1, the second axis CL2, the third axis CL3, and the fourth axis CL4 are parallel to each other in a horizontal direction perpendicular to the forward/backward direction of the electrified vehicle 10. In addition, the transaxle 92 is mounted on electrified vehicle 10 in such a manner that the positions of the first axis CL1, the second axis CL2, the third axis CL3, and the fourth axis CL4 are in the order of the second electric motor MG2, the driven shaft 30, the first electric motor MG1, and the differential gear 34 downward from the upper side in the vertical direction, and in the order of the first electric motor MG1, the driven shaft 30, the differential gear 34, and the second electric motor MG2 rearward from the front side in the forward/reverse direction. As a result, the vertical size of the transaxle 92 is reduced while the distance between the axes of the first axis CL1, the second axis CL2, the third axis CL3, and the fourth axis CL4 is appropriately secured. Thus, the arrangement of the first electric motor MG1 and the second electric motor MG2 creates an excess space B1 and a space B2 in the vertical upper part of the second electric motor MG2. The power control unit 54 is mounted in the space B (B1+B2).

The power control unit 54 is disposed vertically above the transaxle 92 in the mounted condition in electrified vehicle 10. In addition, the power control unit 54 is arranged such that the vertical lower part of the power control unit 54 overlaps the vertical upper part of the transaxle 92, in particular the second electric motor MG2, in the horizontal direction, in particular in the forward and backward direction. In other words, when the power control unit 54 is mounted in electrified vehicle 10, the lower part of the power control unit 54 in the vertical direction is disposed above the first electric motor MG1 in the vertical direction.

The power control unit 54 is mounted in the space created by the reduced vertical size of the transaxle 92, creating space above the hybrid drive unit 90 in the vertical direction. AC charger 74 is disposed in a space created vertically above the hybrid-drive unit 90 in the mounted state in electrified vehicle 10. That is, AC charger 74 is disposed vertically above the hybrid-drive unit 90 in the mounted condition in electrified vehicle 10.

Figure 4:
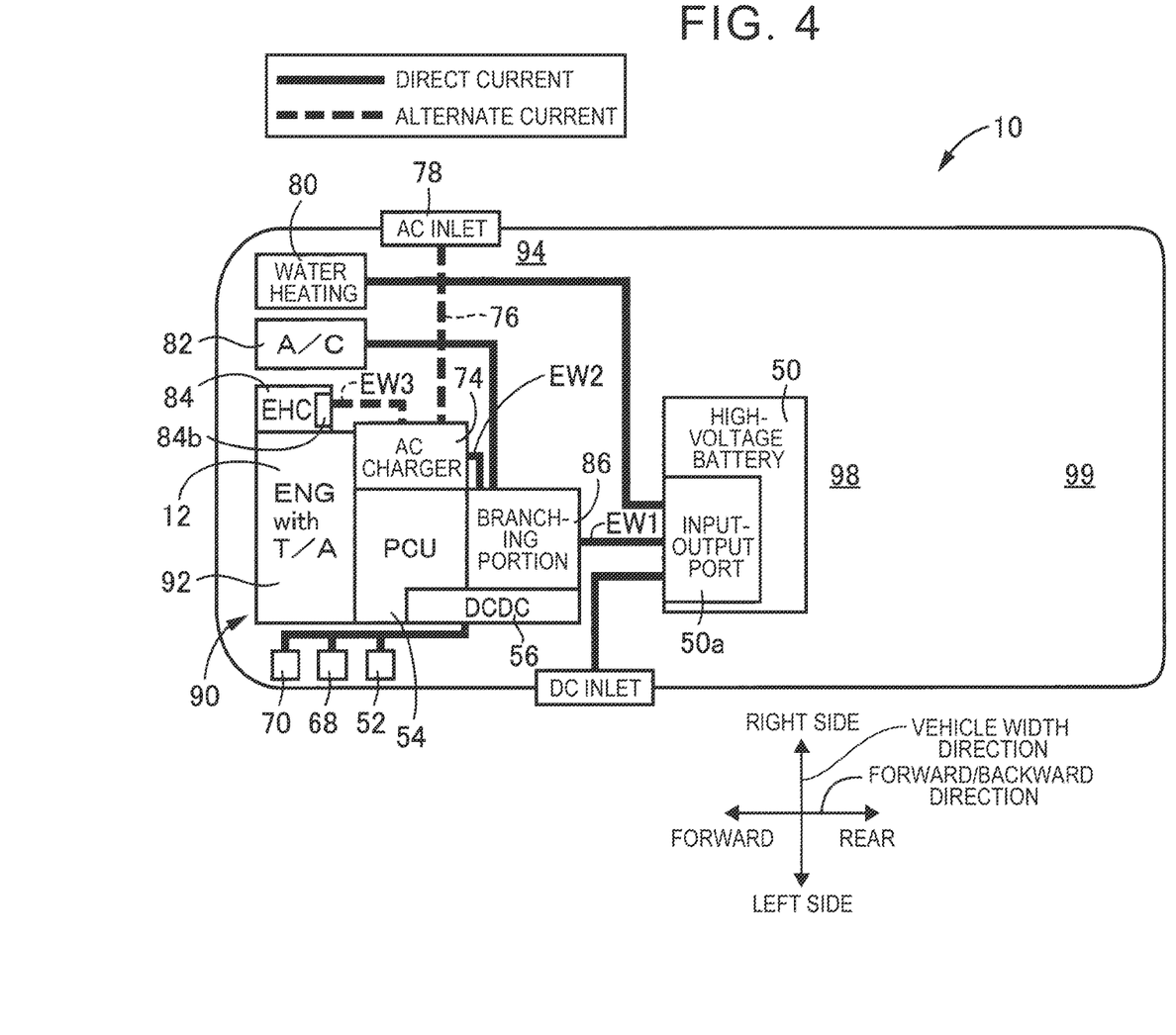
FIG. 4 is a plan view of an electrified vehicle including a hybrid-drive unit, a high-voltage battery, and the like, from above in a vertical direction.
Figure 5:
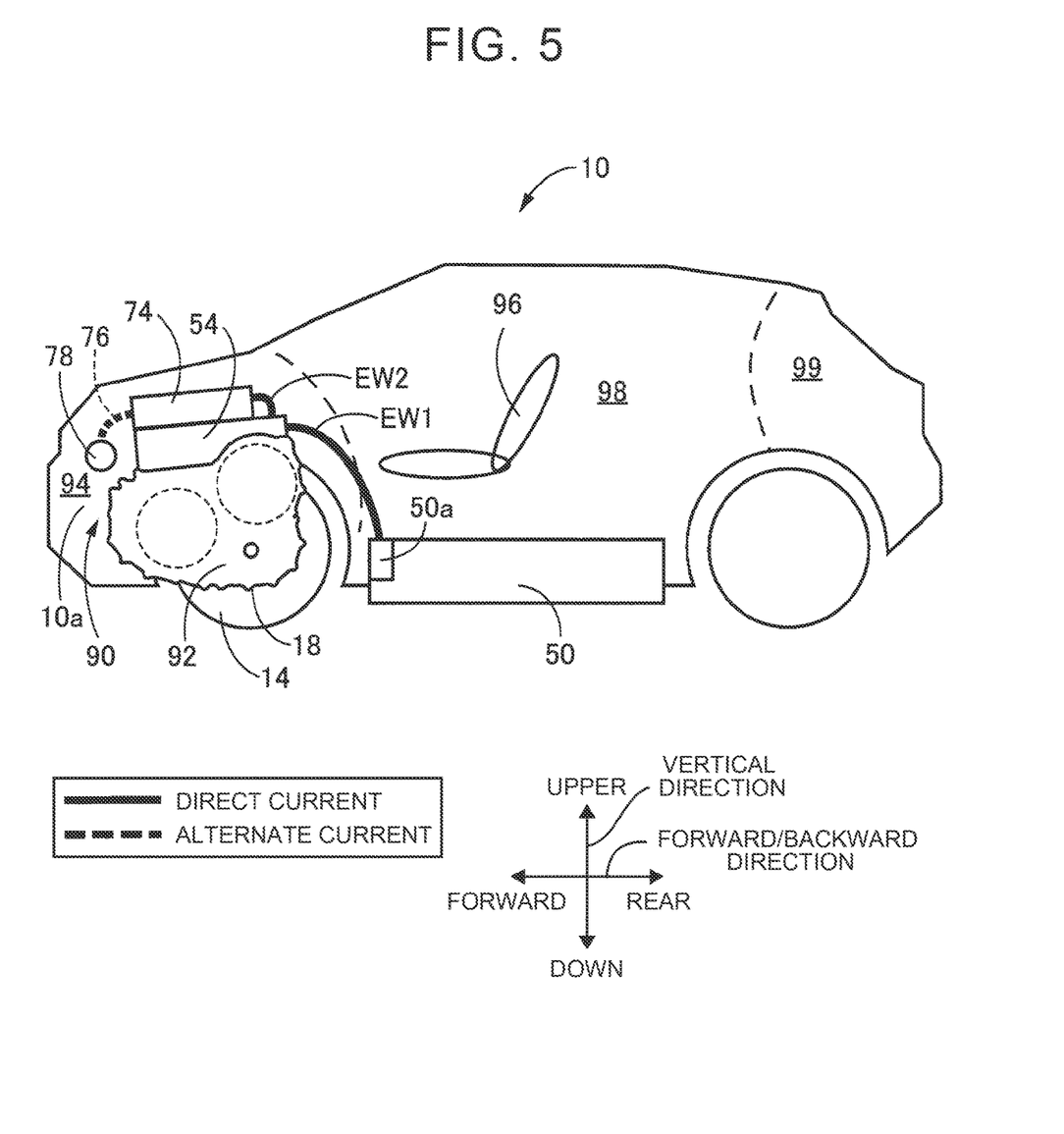
FIG. 5 is a diagram illustrating an exemplary condition in which a hybrid-driven unit, a high-voltage battery, or the like is mounted on an electrified vehicle, and it is an external view from the left side of electrified vehicle in the vehicle widthwise direction.

FIG. 4 and FIG. 5 are diagrams illustrating an exemplary electrified vehicle 10 in which the hybrid-drive unit 90, the high-voltage battery 50, and the like are mounted. In particular, FIG. 4 is a diagram for explaining an example of an electric wiring around the power control unit 54 and an electric wiring around the high voltage battery 50. FIG. 4 is a plan view of electrified vehicle 10 from above in the vertical direction. FIG. 5 is an external view of electrified vehicle 10 from the left side in the vehicle-width direction. In FIG. 4, in order to explain the electric wire, the power control unit 54 is described next to the transaxle 92, and AC charger 74 is described next to the power control unit 54.

In FIGS. 4 and 5, the hybrid drive unit 90 is arranged in the front compartment 94. The front compartment 94 is a power source chamber that houses a power source. Since electrified vehicle 10 includes the engine 12 as a power source, the front compartment 94 is in agreement with the engine compartment. The front compartment 94 is provided adjacent to the driver's seat chamber 98 in which the driver's seat 96 is located. The front compartment 94 is provided forward and backward in electrified vehicle 10 with respect to the driver's seat chamber 98. In FIG. 4, the engine 12 is referred to as "ENG", and the transaxle 92 is referred to as "T/A".

The high-voltage battery 50 is disposed on the side of the front compartment 94 that is vertically lower with respect to the driver's seat chamber 98. In addition, the high-voltage battery 50 is provided with a power input-output port 50a on the front-compartment 94. Accordingly, the path length of the electrical wiring connecting the power control unit 54 and the high-voltage battery 50 can be shortened.

Figure 6:
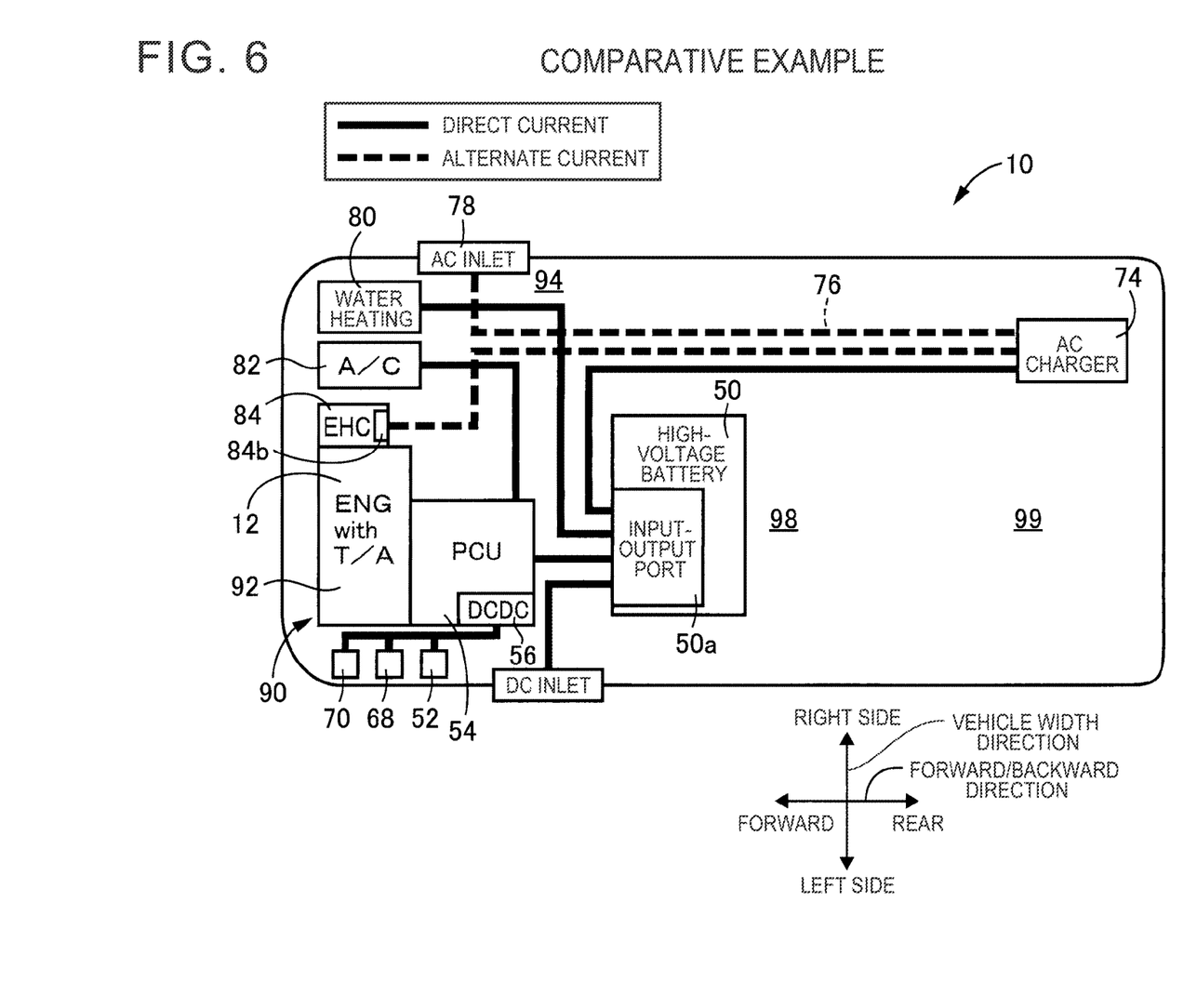
FIG. 6 is a diagram illustrating a comparative example in which an AC charger or the like is mounted on an electrified vehicle.

In the comparative example shown in FIG. 6, AC charger 74 is disposed in a rear compartment 99 provided behind the driver's seat chamber 98 in the forward-backward direction of electrified vehicle 10. The rear compartment 99 is a space facing away from the front compartment 94 with respect to the driver's seat chamber 98, for example an electrified vehicle 10 luggage compartment. Therefore, the line length of the electric wire connecting AC charger 74 and the high-voltage battery 50 is increased. If AC charger 74 needs to be cooled by water cooling, water piping to the rear compartment 99 is also required. In contrast, in the present embodiment, AC charger 74 is disposed vertically above the hybrid-drive unit 90 and is disposed within the front-compartment 94. Therefore, the line length of the electric wire connecting AC charger 74 and the high-voltage battery 50 is shortened as compared with the comparative embodiment of FIG. 6.

Electrified vehicle 10 includes a first electric wire EW1 that connects the input-output port 50a of the high-voltage battery 50 and the power control unit 54. Electrified vehicle 10 also includes a second electric wire EW2 connecting the power control unit 54 and AC charger 74. The first electric wire W1 and the second electric wire EW2 are connected to each other by the power control unit 54. That is, the power control unit 54 is provided with a branching portion 86 that branches the electric path from the high-voltage battery 50

(see FIG. 2). The branching portion 86 is connected to the power control unit 54 side of the first electric wire EW1 and the power control unit 54 side of the second electric wire EW2. As a result, AC charger 74 and the high-voltage battery 50 are connected.

Electrified vehicle 10 includes a third electric wire EW3 that connects the electric heater 84b of the electrically heated catalyst 84 and AC charger 74. Thus, the electric heater 84b is supplied with the alternating current converted by AC charger 74 from the direct current of the high-voltage battery 50.

The auxiliary battery 52, the electronic control device 68, the engine control device 70, and the water heater 80 are disposed in the front compartment 94. DCDC converters 56 are connected to the high-voltage battery 50 at the branching portion 86 (see FIG. 2). The water heater 80 is directly connected to the high-voltage battery 50 without passing through the branching portion 86, and electric power is directly supplied from the high-voltage battery 50.

The electric compressor 82 is disposed in the front compartment 94. The electric compressor 82 is connected to the high-voltage battery 50 at the branching portion 86 (see FIG. 2).

Electrified vehicle 10 comprises an AC inlet 78 in the skin 10a forming the front-compartment 94. Accordingly, the length of the in-vehicle charging cable 76 can be shortened.

As described above, according to the present embodiment, AC charger 74 is disposed above the hybrid-drive unit 90. In addition, the high-voltage battery 50 disposed on the front compartment 94 side vertically below the driver's seat chamber 98 is provided with an input-output port 50a on the front compartment 94 side. In addition, the power control unit 54 is provided with a branching portion 86 in which the power control unit 54 side of the first electric wire EW1 and the power control unit 54 side of the second electric wire EW2 are connected to each other. This makes it possible to shorten the path length of the electric wire connecting AC charger 74 and the high-voltage battery 50 as compared with the case where AC charger 74 is disposed in the rear compartment 99. In addition, AC charger 74 and the high voltage battery 50 need only be connected substantially by the path length of the second electric wire EW2 because the first electrical wire EW1 is utilized. Therefore, it is possible to shorten the path length of the electric wire in electrified vehicle 10.

By shortening the path length of the electrical wiring, cost and mass can be reduced. In addition, when AC charger 74 needs to be cooled by a water cooling method, the path length of the water pipe can be shortened, or a water cooling system of a device (for example, the power control unit 54 or the like) cooled by a water cooling method can be used. In addition, it is possible to avoid narrowing of the rear compartment 99.

Further, according to the present embodiment, a third electric wire EW3 for connecting the electric heater 84b of the electrically heated catalyst 84 and AC charger 74 is further provided. Thus, electric power can be supplied to the electric heater 84b. In addition, since the engine 12 is disposed at a position adjacently to the hybrid drive unit 90, it is easy to secure a space for routing the third electric wire EW3.

Further, according to the present embodiment, the auxiliary battery 52, the electronic control device 68, the engine control device 70, and the water heater 80 are disposed in the front compartment 94. The auxiliary battery 52, the electronic control device 68, and the engine control device 70 are powered by DCDC converters 56 connected to the high voltage battery 50 at a branching portion 86. The water heater 80 is directly supplied with electric power from the high-voltage battery 50 without passing through the branching portion 86. Thus, when the water heater 80 is not mounted in hybrid electric vehicle where the plug-in charging is not employed, in addition to not arranging AC charger 74, the water heater 80 and the electric wire connecting the water heater 80 and the high-voltage battery 50 need not be arranged. Therefore, hybrid electric vehicle and plug-in hybrid electric vehicle that do not employ the plug-in charge can share the units and can share the production lines. The plug-in charging is charging the high-voltage battery 50 by AC charger 74, that is, charging the high-voltage battery 50 by AC charger 74.

Further, according to the present embodiment, the power control unit 54 is disposed vertically above the transaxle 92 in the mounted condition in electrified vehicle 10. In addition, the lower vertical portion of the power control unit 54 is disposed at a position that overlaps the upper vertical portion of the transaxle 92 in the horizontal direction. This appropriately reduces the vertical physique of the hybrid drive unit 90 and creates space in the front compartment 94 above the hybrid drive unit 90 in the vertical direction. In electrified vehicle 10, the degree of freedom in the arrangement position of AC charger 74 and the like is increased by the miniaturization of the hybrid-drive unit 90.

Further, according to the present embodiment, the front compartment 94 is provided in front of the driver's seat chamber 98 in the forward/backward direction of electrified vehicle 10. As a result, it is possible to appropriately avoid narrowing of the rear compartment 99.

Although the examples of the present disclosure have been described in detail with reference to the drawings, the present disclosure also applies to other modes.

For example, in the above-described embodiment, the position of each of the first axis CL1, the second axis CL2, the third axis CL3, and the fourth axis CL4 of the transaxle 92 in the mounted condition in electrified vehicle 10 is the order of the first electric motor MG1, the driven shaft 30, the differential gear 34, and the second electric motor MG2 from the front to the rear in the forward-backward direction, but the present disclosure is not limited to this embodiment. For example, when the transaxle 92 is mounted in electrified vehicle 10, the positions of the first axis CL1, the second axis CL2, the third axis CL3, and the fourth axis CL4 may be in the order of the first electric motor MG1, the driven shaft 30, the differential gear 34, and the second electric motor MG2.

Further, in the above-described embodiment, the water heater 80 is directly supplied with electric power from the high-voltage battery 50, but is not limited to this embodiment. For example, the water heater 80 may be powered via AC charger 74. Even in this manner, when the water heater 80 is not mounted in hybrid electric vehicle where the plug-in charging is not employed, in addition to not arranging AC charger 74, the water heater 80 and the electric wires connecting the water heater 80 and AC charger 74 need not be arranged. Therefore, hybrid electric vehicle and plug-in hybrid electric vehicle that do not employ the plug-in charge can share the units and can share the production lines.

Further, in the above-described embodiment, the front compartment 94 is exemplified as the power source chamber accommodating the power source, but the present disclosure is not limited to this embodiment. For example, the power source chamber housing the power source may be a rear compartment 99. Here, the hybrid-drive unit 90, AC charger 74, AC inlet 78, etc. are arranged in the rear compartment 99. In addition, the high-voltage battery 50 is disposed on the rear compartment 99 side vertically below the driver's seat chamber 98, and an input-output port 50a is provided on the rear compartment 99 side.

In addition, in the above-described embodiment, electrified vehicle may be a battery electric vehicle provided with an electric motor for driving. In this situation, for example, the first electric motor MG1 is deleted at the positions where the components of the transaxle 92 shown in FIG. 3 are arranged, and the second electric motor MG2 functions as battery electric vehicle electric motor. In short, the present disclosure can be applied as long as it is a vehicle capable of plug-in charging. Alternatively, electrified vehicle may be a series-type hybrid electric vehicle including an engine, an electric motor for driving functioning as a power source, and an electric motor for supplying electric power that is connected to the engine so as to be able to transmit power and generates electric power by the power of the engine. In such a series-type hybrid electric vehicle, the power transmission path between the engine and the drive wheels may be interrupted or connected by the operation of the clutch. Alternatively, electrified vehicle may be a parallel hybrid electric vehicle including an engine, a power transmission device that transmits power from the engine to the drive wheels, and an electric motor that transmits power to the drive wheels via the power transmission device.

It should be noted that the embodiment described above is merely one embodiment, and the present disclosure can be implemented in a mode in which various changes and improvements are made based on the knowledge of those skilled in the art.

What is claimed is:

1. An electrified vehicle comprising:
   an electric motor functioning as a power source;
   a power transmission device for transmitting power from the electric motor to a drive wheel;
   a battery for driving;
   a charger for charging the battery by electric power supplied from an external power source; and
   a power control device for controlling electric power transmitted and received between the battery and the electric motor, wherein:
   a drive device including the electric motor and the power transmission device, and the power control device are housed, as an electromechanical integrated unit, in the same case, and are disposed in a power source chamber that is adjacent to a driver's seat chamber in which a driver's seat is disposed;
   the charger is disposed above the electromechanical integrated unit in a vertical direction in a state in which the charger is mounted on the electrified vehicle;
   the battery is disposed on the power source chamber side below the driver's seat chamber in the vertical direction, and is provided with an input-output port for electric power on the power source chamber side; and
   the electrified vehicle further includes
   a first electric wire connecting the input-output port of the battery and the power control device,
   a second electric wire connecting the power control device and the charger, and
   a branching portion that is provided in the power control device and branches an electric path from the battery, the electric path being a path to which each of the power control device side of the first electric wire and the power control device side of the second electric wire is connected.

2. The electrified vehicle according to claim 1, wherein:
   the electrified vehicle is a plug-in hybrid electric vehicle including an engine disposed at a position adjacent to the electromechanical integrated unit; and
   the electrified vehicle further includes
   an electrically heated catalyst that is provided in an exhaust passage of the engine, and includes a catalyst and an electric heater, and
   a third electric wire connecting the electric heater and the charger.

3. The electrified vehicle according to claim 2, wherein:
   the power control device includes a voltage converter for stepping down electric power from the battery;
   a control device different from an auxiliary battery and the power control device to which the electric power stepped down by the voltage converter is supplied, and a water heater for heating a fluid as a heat source of a heater in the driver's seat chamber are disposed in the power source chamber; and
   electric power is directly supplied from the battery to the water heater, or electric power is supplied to the water heater through the charger.

4. The electrified vehicle according to claim 1, wherein the power control device is disposed above the drive device in the vertical direction in a state in which the power control device is mounted on the electrified vehicle, and a lower portion of the power control device in the vertical direction is disposed at a position overlapping an upper portion of the drive device in the vertical direction when seen from a horizontal direction.

5. The electrified vehicle according to claim 4, wherein the power source chamber is provided in front of the driver's seat chamber in a front-rear direction of the electrified vehicle.

* * * * *